United States Patent [19]

Rimmele

[11] Patent Number: 4,762,039
[45] Date of Patent: Aug. 9, 1988

[54] METHOD OF AND APPARATUS FOR SEVERING PROFILED STRIPS OF METALLIC MATERIAL

[75] Inventor: Karl Rimmele, Schmerikon, Switzerland

[73] Assignee: Mecapec S.A, Schmerikon/SG, Switzerland

[21] Appl. No.: 905,800

[22] Filed: Sep. 10, 1986

[30] Foreign Application Priority Data

Sep. 25, 1985 [DE] Fed. Rep. of Germany ....... 3534127

[51] Int. Cl.⁴ ............................................. B23D 25/04
[52] U.S. Cl. ............................................ 83/37; 83/51; 83/314; 83/319; 83/320; 83/578; 83/580
[58] Field of Search ................... 83/37, 49, 51, 314, 83/319, 320, 578, 580

[56] References Cited

U.S. PATENT DOCUMENTS

| | | | |
|---|---|---|---|
| 1,759,025 | 5/1930 | Sutherland et al. | 83/578 |
| 2,258,348 | 10/1941 | Biggert, Jr. | 83/578 X |
| 3,081,657 | 3/1963 | Harris | 83/319 X |
| 3,121,360 | 2/1964 | Hill | 83/314 X |
| 3,566,728 | 3/1971 | Ohmasu et al. | 83/319 X |
| 3,757,627 | 9/1973 | Lange | 83/51 X |
| 3,808,923 | 5/1974 | Plegat | 83/319 X |
| 3,857,311 | 12/1974 | Esser | 83/51 |

FOREIGN PATENT DOCUMENTS 1904975 8/1970 Fed. Rep. of Germany .......... 83/51

Primary Examiner—Frank T. Yost
Attorney, Agent, or Firm—Peter K. Kontler

[57] ABSTRACT

A running strand of hot steel stock is severed at desired intervals by two knives which are located in a common plane and are mounted in a common holder movable transversely of the advancing strand by a double-acting hydraulic or pneumatic cylinder and piston assembly. The holder for the knives is coupled to the strand prior to start of the severing operation, and one of the knives is thereupon caused to penetrate into the material of the strand to be retracted prior to penetration, or simultaneously with penetration, of the other knife which operates in the same plane so that the stock is severed without the formation of burrs, fins or similar irregularities.

16 Claims, 2 Drawing Sheets

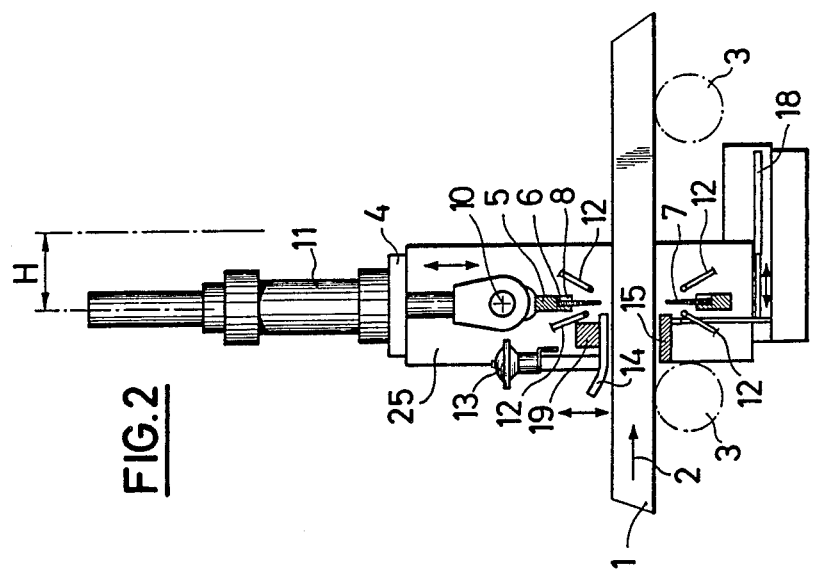
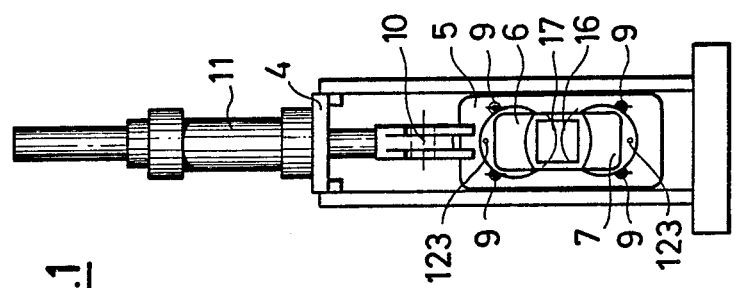

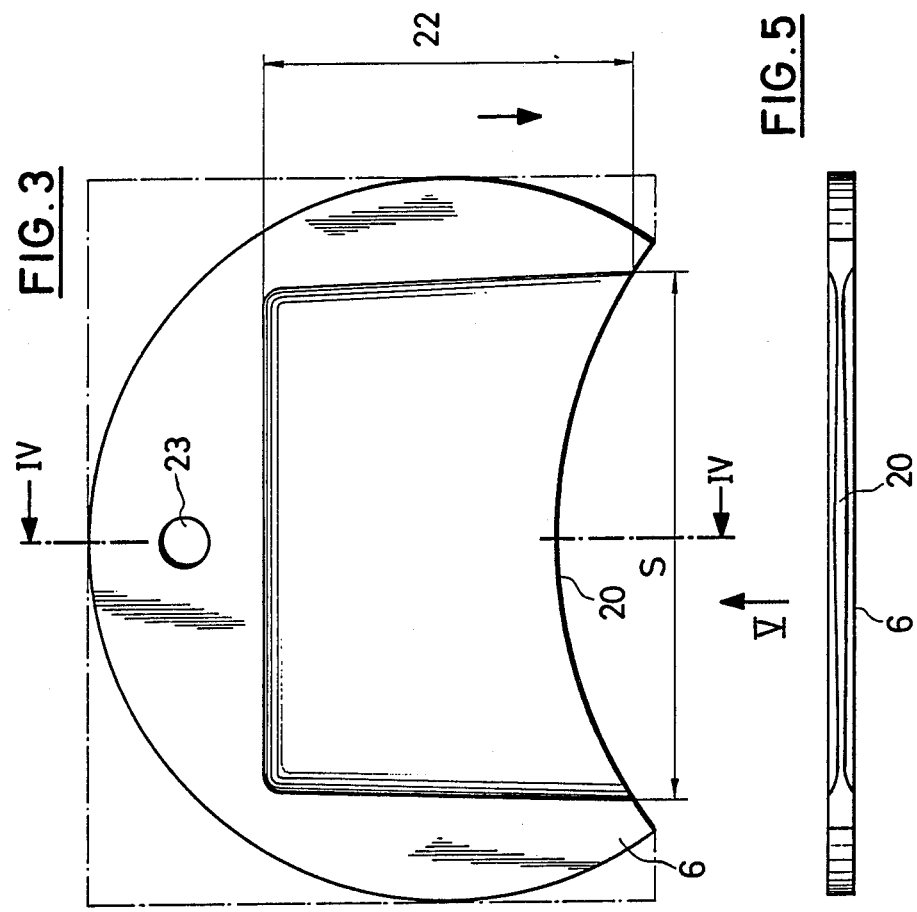
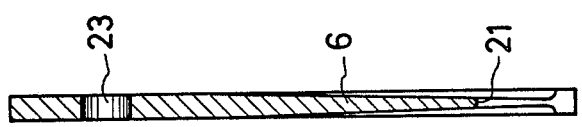

METHOD OF AND APPARATUS FOR SEVERING PROFILED STRIPS OF METALLIC MATERIAL

BACKGROUND OF THE INVENTION

The present invention relates to a method of and to an apparatus for severing elongated bodies (hereinafter called strips or strands) of metallic material. More particularly, the invention relates to improvements in a method of and in an apparatus for severing profiled strands or strips of metallic material which is to be severed at an elevated temperature. Still more particularly, the invention relates to improvements in a method of and in an apparatus for severing or subdividing elongated strips or strands of metallic material, such as steel, while the material is in motion.

In accordance with heretofore known proposals, elongated strands of steel or another metallic material are normally severed by an apparatus which burns the material of the strands. For example, such apparatus can be used to subdivide a continuous strand of heated metallic stock into individual sections such as billets or blooms. A drawback of apparatus which sever the material by combustion is that losses in material are quite substantial. Furthermore, the apparatus are rather expensive because they must be equipped with a source of a gaseous fluid (normally oxygen). Such apparatus are likely to contaminate the area around the severing station.

It is also known to sever running strands of hot metallic stock by tongs or shears. Such severing apparatus are often utilized in plants wherein the strand is produced by continuous casting. They exhibit several serious drawbacks, e.g., the cut is not clean because the blades of the tongs are located in two parallel planes so that the regions of cut exhibit burrs, fins or similar irregularities. Furthermore, the tongs must advance with the running strand of metallic material through a considerable distance which contributes to the bulk, complexity and cost of the apparatus. Still further, the maintenance cost of the apparatus which employ tongs is quite high.

OBJECTS AND SUMMARY OF THE INVENTION

An object of the invention is to provide a novel and improved method of severing a running strand or strip of metallic material in such a way that the cuts are clean, namely without burrs and similar irregularities.

Another object of the invention is to provide a method which ensures reliable and predictable severing of the strand even if the material of the strand is maintained at a high or very high temperature.

A further object of the invention is to provide a method which can be used for proper severing of rapidly or slowly advancing metallic stock irrespective of the exact profile of the stock.

Still another object of the invention is to provide a novel and improved apparatus for the practice of the above outlined method and to construct and assemble the apparatus in such a way that it occupies little room and can reliably and cleanly sever all kinds of elongated metallic workpieces irrespective of their profiles and/or temperatures.

A further object of the invention is to provide the apparatus with novel and improved means for severing the running strip or strand of metallic material.

An additional object of the invention is to provide the apparatus with novel and improved means for ensuring that the severing instrumentalities share the movements of the strand while the strand is being severed in a selected plane.

A further object of the invention is to provide a simple, compact and inexpensive apparatus which can be used in multi-strand machines, wherein all parts which require maintenance, inspection and/or repair are readily accessible and which can be installed in existing plants for the casting of continuous metallic bodies in the form of profiled strips, strands or bars of metallic material.

One feature of the invention resides in the provision of a method of severing a strand or strip of metallic stock, particularly a heated profiled steel stock, which advances along a predetermined path, with first and second knives which are disposed at opposite sides of the path. The method comprises the steps of advancing the knives with the strand, moving one of the knives transversely of the path and into the material of the moving strand so that the one knife partially severs the strand in a predetermined plane, and moving the other knife in the predetermined plane and into the strand so that the other knife at least substantially completes the severing of the strand in the predetermined plane.

The path is or can be substantially horizontal, and the one knife can be moved into the strand from above or from below. The advancing step can include mounting the knives in a holder and coupling the holder to the strand. The moving steps can include moving the knives by a hydraulic or pneumatic motor.

Another feature of the invention resides in the provision of an apparatus for severing a strand of metallic stock, particularly a heated profiled steel stock. The apparatus comprises means for moving the strand along a predetermined path, first and second knives which are disposed at opposite sides of the path, means for effecting a movement of the knives with the advancing strand so that the knives are located in a common plane extending transversely of the path, and means for moving the knives seriatim into the material of the strand so that one of the knives partially severs the strand in the common plane and the other of the knives thereupon at least substantially completes the severing of the strand in the common plane.

The path for the strand is or can be substantially horizontal, and the first and second knives can be respectively located above and below the path prior to movement into the material of the strand.

The moving means can comprise a holder for the first and second knives and motor means for moving the knives through the medium of the holder. The movement effecting means can comprise a device which separably couples the holder to the strand for the interval of time which is required to complete the severing operation by the first and second knives. Such apparatus can further comprise means for articulately connecting the holder to the motor means.

At least one of the knives, for example, the first knife, can be provided with a substantially concave cutting edge which is or can be dull. Furthermore, such one knife can be provided with a wedge-like portion which is adjacent to and tapers toward the cutting edge.

At least one of the knives can have a substantially circular outline. Alternatively, at least one of the knives can have a polygonal outline, particularly a square or rectangular outline.

Still further at least one of the knives can be provided with an opening, and the moving means for such knife can include a holder and means for securing the one knife to the holder. The securing means can extend into the opening of the one knife.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a front elevational view of an apparatus which embodies the present invention;

FIG. 2 is a side elevational view, with certain parts shown in vertical section;

FIG. 3 is an enlarged side elevational view of one of the knives in the apparatus of FIGS. 1 and 2;

FIG. 4 is a sectional view as seen in the direction of arrows from the line IV—IV of FIG. 3; and FIG. 5 is an end elevational view of the knife as seen in the direction of arrow V in FIG. 3.

DESCRIPTION OF THE PREFERRED EMBODIMENTS

The apparatus which is shown in FIGS. 1 and 2 comprises means for advancing an elongated strip or strand 1 of profiled steel stock along a horizontal path in the direction of arrow 2. The advancing means comprises several driven transporting rollers 3 two of which are indicated in FIG. 2 by phantom lines. The strand 1 can constitute a continuous casting which must be subdivided at regular or irregular intervals so as to yield a succession of sections in the form of blooms, billets or the like. It is assumed that the strand 1 is hot or very hot during travel through the apparatus of the present invention.

The severing unit 4 of the improved apparatus comprises two knives 6 and 7 which are respectively disposed at a level above and at a level below the path of the strand 1 when the apparatus is idle. The knives 6 and 7 are mounted in a common holder 5 which can resemble a ring or a U-shaped body and is articulately connected to a double-acting hydraulic or pneumatic motor 11 by a pivot member 10. The knives 6 and 7 are readily detachable from the respective portions of the holder 5. To this end, the knives are held in proper positions by suitable covers 8 and by means of wedge-like or other suitable retaining elements 9. A feature of the severing unit 4 (which includes the holder 5, the motor 11 and the knives 6 and 7) is that the knives are located in a common vertical plane which extends at right angles to the path of movement of the strand 1 in the direction of the arrow 2. However, it is equally possible to position the knives 6 and 7 in such a way that their common plane is inclined to the vertical. The placing of the knives 6 and 7 into a common plane is in contrast to the construction of conventional tongs or shears wherein the blades are located in two parallel planes. The mounting of blades in parallel planes invariably entails the making of burrs, fins or other irregularities.

The motor 11 of the severing unit 4 has one or more cylinder and piston assemblies capable of shifting the holder 5 with the knives 6 and 7 up and down relative to a frame 25.

The apparatus further comprises a plurality of nozzles 12 which are connected to a source of coolant (for example, to a source of compressed atmospheric air) and can direct jets of coolant toward locations where the cutting edges of the knives 6 and 7 penetrate into the material of the strand 1.

The apparatus also comprises a device which can couple the knives 6 and 7 (and more particularly the holder 5) to the advancing strand 1 for a period of time which is required to ensure that the knives 6 and 7 complete the severing of the strand in a preselected plane. The coupling device comprises an anvil 15 at the underside of the advancing strand 1, a shoe 14 which is located opposite the anvil 15 at a level above the path for the strand 1, and a fluid-operated motor 13 (for example, a motor operated by compressed air) which can move the shoe 14 up and down so as to clamp the running strand 1 between the upper side of the anvil 15 and the underside of the shoe 14. The directions in which the shoe 14 is movable relative to the path of the strand 1 are indicated by a double-headed arrow.

If the operator or an automatic monitoring device (not shown) decides to sever the strand 1 at a selected distance from its leading end, the motor 13 is actuated to lower the shoe 14 so that the strand is clamped between the shoe and the anvil 15, i.e., the frame 25 for the severing unit 4 is compelled to advance in the direction of the arrow 2. The motor 11 is thereupon actuated to lower the holder 5 with the knives 6 and 7 so that the knife 6 penetrates into the strand 1 from above and provides it with a notch extending, for example, to the level 16 shown in FIG. 1. In the next step, the motor 11 lifts the holder 5 with the knives 6 and 7 so that the knife 6 is extracted from the notch and the knife 7 penetrates into the moving strand 1 from below to a level indicated by the reference character 17 shown in FIG. 1. This completes the severing of the strand 1 in the common plane of the knives 6 and 7. The reversible motor 11 can be operated in such a way that the knife 7 penetrates into the strand 1 from below before the knife 6 penetrate into the strand 1 from above or vice versa. The freshly severed front portion of the strand 1 can be pushed forwardly by the remainder of the strand or can be removed from the apparatus laterally or forwardly in a manner not specifically shown in the drawing. The motor 13 is thereupon actuated to move the shoe 14 away from the anvil 15 so that the frame 25 ceases to share the movement of the strand 1 in the direction of the arrow 2. The forward stroke of the frame 25 is indicated in FIG. 2 by the reference character H. The character 18 denotes a pneumatic spring which can be used to push or otherwise move the frame 25 back to the starting position of FIG. 2. The apparatus is then ready to make the next cut across the running strand 1. The pneumatic spring or springs 18 can be replaced with mechanical resilient elements, with dashpots or with any suitable means for retracting or pushing the frame 25 back to its starting position.

If the strand 1 is made of a continuous casted steel, its temperature is normally in the range of between 700° and 1150° C., depending on the quality of the steel and the location of the severing unit 4 relative to the casting station. For example, the strand 1 can have a cross-section with an area of 180 mm$^2$. The improved apparatus can readily complete a cut across the running strand 1 having such a cross section within an interval of four and a half seconds or even less. This ensures that the forward stroke H of the frame 25 is surprisingly short. In other words, the space requirements of the improved apparatus in a casting plant are small.

An advantage of the anvil 15 is that it cooperates with the transporting rollers 3 in properly guiding the moving strand 1 in the course of the severing operation.

The shoe 14 and/or the anvil 15 can be reinforced so as to ensure that such parts can properly assist the rollers 3 in advancing the strand 1 along its predetermined path, regardless of whether the frame 25 moves forwardly or backwards. FIG. 2 shows a reinforcing traverse or beam 19 for the shoe 14. When the coupling device 13-15 is active, the shoe 14 acts not unlike a hold-down device for the strand 1, i.e., the strand is pushed downwardly toward the apices of the transporting rollers 3.

FIGS. 3, 4 and 5 illustrate certain presently preferred forms of knives (for example, of the knife 6) which can be used in the apparatus of the present invention. As shown, the knife 6 has a concave cutting edge 20 which is dulled or dull, as at 21 (see particularly FIG. 5). The length of the cutting edge 20 in the direction of the arrow 2 (from the left to the right, as seen in FIG. 3) is greater than the width S of the strand 1 in its horizontal path. Furthermore, and as shown in FIG. 4, the knife 6 includes a wedge-like portion having a height 22 and tapering toward the dull or dulled lowermost part 21 of the cutting edge 20. The height and width of the wedge-shaped portion need not exceed the width (S) and the height of that portion of the knife 6 which penetrates into the material of the strand 1 when the apparatus is in actual use. This contributes to greater stability and longer useful life of the knife because the remaining portion of the knife can be made stronger. In addition, this contributes to lower cost of the knife because only a relatively small part thereof must be treated or shaped in a material removing or other machine to provide it with a wedge-like portion.

The upper portion of the knife 6 has one or more openings 23 in the form of circular holes or bores which can receive pins 123 serving as a means for separably connecting the knife 6 to its holder 5.

The knife 6 can have a circular or substantially circular outline (as shown in FIG. 3 by a solid line) or a polygonal (particularly a square or rectangular) outline as shown in FIG. 3 by a phantom line. The selection of the outline of the knife 6 will depend upon the starting material of the knife and will be determined with a view to ensure that the knife can be produced and finished at a minimal cost. If the starting material is a round piece of metal which is obtained by rolling or in accordance with a similar procedure, the knife 6 will have an outline as shown in FIG. 3 by solid lines. If the starting material for the knife 6 has a polygonal outline, the knife which is made from the blank will have a polygonal outline, such as a square or rectangular outline.

The utilization of a knife having a concave cutting edge 20 exhibits several advantages. First of all, the making of a notch in the material of the running strand takes place gradually and gently. This will be readily appreciated since the concave cutting edge penetrates gradually into the material of the strand in contrast to the utilization of knives with straight cutting edges wherein a large portion of or the entire cutting edge is caused to penetrate into the material of the workpiece instantaneously with attendant pronounced stressing of the apparatus and the likelihood of making an irregular cut.

An additional important advantage of the illustrated knife 6 is that the concave cutting edge 20, in cooperation with the wedge-like portion which tapers toward the cutting edge 20, reduces the likelihood of the formation of burrs or fins at the lateral surfaces of the running strand 1. The design of the knife 6 can be such that the wedge-like portion tapers from the cutting edge 20 gradually toward the opening 23, as well as outwardly toward other portions of the periphery of the knife 6 so that the thinnest portion of the knife is adjacent the cutting edge 20 and the thickness of the knife increases all the way around toward its periphery.

The knives can be made of hot-work steel which can be coated with a suitable wear-resistant material to lengthen the useful life of the knives. However, it is equally possible to make the knives of a hard metal or from a combination of hard metal and hot-work steel.

Everything that applies for the knife 6 of FIGS. 3-5 also applies, or can apply, for the other knife 7.

An important advantage of the improved apparatus is that it occupies little room as well as that its knives can sever the strand 1 without the formation of burrs or the like in the severing plane. Such apparatus are particularly suitable in plants wherein several strands of hot metallic material are discharged simultaneously.

An additional important advantage of the improved apparatus is that it comprises a small number of relatively simple parts so that it is not prone to malfunction and, if necessary, can be repaired in a time-saving operation by personnel requiring little or no training for such work.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of severing a strand of heated metallic stock, particularly a profiled steel stock, which advances along a predetermined path, with a severing unit consisting of first and second knives which are disposed at opposite sides of the path, comprising the steps of advancing the knives with the strand; moving one of the knives transversely of the path and into the material of the moving strand so that the one knife penetrates into and partially severs the strand in a predetermined plane; and moving the other knife in said plane into the strand so that the other knife penetrates into and at least substantially completes the severing of the strand in said plane.

2. The method of claim 1, wherein said path is substantially horizontal and the one knife is moved into the strand from above.

3. The method of claim 1, wherein said path is substantially horizontal and the one knife is moved into the strand from below.

4. The method of claim 1, wherein said advancing step includes mounting the knives in a holder and coupling the holder to the strand.

5. The method of claim 1, wherein the moving steps include moving the knives by a fluid-operated motor.

6. Apparatus for severing a strand of heated metallic stock, particularly a profiled steel stock, comprising means for moving the strand along a predetermined path; a severing unit consisting of first and second knives disposed at opposite sides of said path; means for effecting a movement of the knives with the advancing strand so that the knives are located in common plane extending transversely of said path; and means for moving said knives seriatim into the material of the strand so that one of the knives penetrates into and partially severs the strand in said plane and the other of said knives thereupon penetrates into and at least substantially completes the severing of the strand in said plane.

7. The apparatus of claim 6, wherein said path is substantially horizontal, said first and second knives being respectively located above and below said path prior to movement into the material of the strand.

8. The apparatus of claim 6, wherein said moving means comprises a holder for said knives and motor means for moving the knives through the medium of said holder.

9. The apparatus of claim 8, wherein said movement effecting means comprises a device for separably coupling said holder to the strand.

10. The apparatus of claim 8, further comprising means for articulately connecting said holder to said motor means.

11. The apparatus of claim 6, wherein at least said first knife has a substantially concave cutting edge.

12. The apparatus of claim 11, wherein said cutting edge is dull.

13. The apparatus of claim 11, wherein said first knife has a wedge-like portion adjacent to and tapering toward said cutting edge.

14. The apparatus of claim 6, wherein at least said first knife has a substantially circular outline.

15. The apparatus of claim 6, wherein at least said first knife has a polygonal outline, particularly a square or rectangular outline.

16. The apparatus of claim 6, wherein at least said first knife has an opening and said moving means includes a holder and means for securing the first knife to said holder, said securing means extending into said opening.

* * * * *